United States Patent
Liebl et al.

(10) Patent No.: US 10,494,940 B2
(45) Date of Patent: Dec. 3, 2019

(54) SEAL SEGMENT ASSEMBLY INCLUDING MATING CONNECTION FOR A TURBOMACHINE

(71) Applicant: MTU Aero Engines AG, Munich (DE)

(72) Inventors: Christian Liebl, Bockhorn (DE); Steffen Schlothauer, Erdweg (DE); Andreas Jakimov, Fahrenzhausen (DE); Alexander Ladewig, Bad Wiessee (DE); Karl Blumenschein, Roehrmoos (DE); Juergen Kraus, Dachau (DE)

(73) Assignee: MTU Aero Engines AG, Munich (DE)

( * ) Notice: Subject to any disclaimer, the term of this patent is extended or adjusted under 35 U.S.C. 154(b) by 271 days.

(21) Appl. No.: 15/479,442

(22) Filed: Apr. 5, 2017

(65) Prior Publication Data
US 2017/0284213 A1     Oct. 5, 2017

(30) Foreign Application Priority Data

Apr. 5, 2016   (EP) .................................... 16163779

(51) Int. Cl.
*F01D 11/00* (2006.01)
*F01D 5/02* (2006.01)
(Continued)

(52) U.S. Cl.
CPC ............ *F01D 11/001* (2013.01); *B22F 5/009* (2013.01); *B33Y 80/00* (2014.12); *F01D 5/02* (2013.01);
(Continued)

(58) Field of Classification Search
CPC ...... F01D 11/001; F01D 11/005; F01D 11/12; F01D 11/125; F01D 11/127;
(Continued)

(56) References Cited

U.S. PATENT DOCUMENTS 3,126,149 A * 3/1964 Bowers, Jr. et al. ........................
F01D 11/125
29/445
3,656,862 A * 4/1972 Rahaim ................. F01D 11/127
415/173.2
(Continued)

FOREIGN PATENT DOCUMENTS

DE        10305899       8/2004
DE        102011102598   11/2012
DE        102013219024   4/2015

OTHER PUBLICATIONS

"NPL_Effect of the build orientation_Published_Aug. 2, 2014"; Published Aug. 2, 2014; retreived from the internet Feb. 26, 2019; https://www.sciencedirect.com/science/article/pii/S0921509314009538 (Year: 2014).*

*Primary Examiner* — Sizo B Vilakazi
*Assistant Examiner* — Brian R Kirby
(74) *Attorney, Agent, or Firm* — Davidson, Davidson & Kappel, LLC

(57) ABSTRACT

A seal segment assembly for a turbomachine, in particular a gas turbine, including a first seal carrier and a second seal carrier, that are adjacently disposed in the circumferential direction, the first seal carrier having a first carrier base and at least one first sealing member that is joined to the first carrier base, and the second seal carrier having a second carrier base and at least one second sealing member that is joined to the second carrier base, the first sealing member and the second sealing member being formed by a plurality of cavities, that are adjacently disposed in the circumferential direction and in the axial direction, in particular evenly spaced, the cavities extending in the radial direction from the particular carrier base. The first carrier base and the second carrier base are intercouplable or are intercoupled in the circumferential direction by a mating connection assembly.

21 Claims, 2 Drawing Sheets

(51) Int. Cl.
   *F01D 9/04* (2006.01)
   *F01D 11/12* (2006.01)
   *B22F 5/00* (2006.01)
   *B33Y 80/00* (2015.01)
   *B33Y 10/00* (2015.01)

(52) U.S. Cl.
   CPC ............ F01D 9/041 (2013.01); F01D 11/127 (2013.01); *B22F 2998/10* (2013.01); *B22F 2999/00* (2013.01); *B33Y 10/00* (2014.12); *F05D 2220/323* (2013.01); *F05D 2230/22* (2013.01); *F05D 2230/234* (2013.01); *F05D 2230/31* (2013.01); *F05D 2240/11* (2013.01); *F05D 2250/283* (2013.01); *F05D 2250/37* (2013.01); *F05D 2250/75* (2013.01); *F05D 2260/36* (2013.01); *Y02P 10/295* (2015.11)

(58) Field of Classification Search
   CPC .......... F01D 11/122; F01D 9/041; F01D 5/02; B33Y 80/00; B33Y 10/00; B22F 5/009; B22F 2999/00; B22F 2998/10; Y02P 10/295; F05D 2250/75; F05D 2240/11; F05D 2230/31; F05D 2250/283; F05D 2230/22; F05D 2250/37; F05D 2260/36; F05D 2220/323; F05D 2230/234
   USPC ...................... 415/173.7, 173.4, 173.6, 174.4
   See application file for complete search history.

(56) References Cited

U.S. PATENT DOCUMENTS

| | | | | |
|---|---|---|---|---|
| 3,867,061 A * | 2/1975 | Moskowitz | ........... | F01D 11/127 415/173.3 |
| 4,346,904 A * | 8/1982 | Watkins, Jr. | .............. | B32B 3/12 277/414 |
| 4,594,053 A * | 6/1986 | Sohngen | ............... | F01D 11/125 277/414 |
| 4,596,116 A * | 6/1986 | Mandet | .................. | F01D 11/08 415/173.2 |
| 4,615,658 A * | 10/1986 | Kagohara | ............... | C22C 30/00 148/327 |
| 4,767,260 A * | 8/1988 | Clevenger | ............... | F01D 9/041 415/115 |
| 5,167,488 A * | 12/1992 | Ciokajlo | ............... | F01D 11/005 415/139 |
| 5,188,507 A * | 2/1993 | Sweeney | .................. | B23H 9/10 415/170.1 |
| 5,344,284 A * | 9/1994 | Delvaux | ............... | F01D 11/22 415/173.2 |
| 5,823,741 A * | 10/1998 | Predmore | ............. | F01D 11/005 415/134 |
| 6,251,494 B1 * | 6/2001 | Schreiber | .............. | F01D 11/127 228/181 |
| 6,692,227 B2 * | 2/2004 | Tomita | .................... | F01D 5/225 415/173.7 |
| 6,962,482 B2 * | 11/2005 | Tanaka | .................... | F01D 5/225 277/414 |
| 7,029,232 B2 * | 4/2006 | Tuffs | .................... | F01D 11/127 415/173.1 |
| 7,596,954 B2 * | 10/2009 | Penda | ..................... | F01D 11/16 415/173.2 |
| 8,684,673 B2 * | 4/2014 | Salazar | ................. | F01D 11/005 277/644 |
| 8,998,573 B2 * | 4/2015 | Albers | .................. | F01D 11/005 415/173.3 |
| 9,238,977 B2 * | 1/2016 | Albers | .................. | F01D 5/225 |
| 2004/0265120 A1 * | 12/2004 | Tuffs | .................... | F01D 11/127 415/170.1 |
| 2005/0002780 A1 * | 1/2005 | Tanaka | .................... | F01D 5/225 415/173.1 |
| 2008/0260522 A1 * | 10/2008 | Alvanos | ................ | F01D 11/001 415/173.4 |
| 2008/0260523 A1 * | 10/2008 | Alvanos | ................ | F01D 11/001 415/173.4 |
| 2008/0280101 A1 * | 11/2008 | Morrison | .............. | F01D 11/122 428/141 |
| 2009/0148278 A1 * | 6/2009 | Allen | ...................... | C23C 26/00 415/173.4 |
| 2013/0071234 A1 * | 3/2013 | Dimelow | ............... | F04D 29/164 415/173.4 |
| 2013/0175325 A1 * | 7/2013 | Lin | ......................... | C23C 10/48 228/124.1 |
| 2014/0020403 A1 * | 1/2014 | Tsukuda | ................ | F01D 11/001 60/805 |
| 2014/0154085 A1 * | 6/2014 | Schlemmer | ........... | F04D 29/644 416/212 A |
| 2014/0367920 A1 * | 12/2014 | Konigs | ............... | B29D 99/0053 277/345 |
| 2015/0001811 A1 * | 1/2015 | Feldmann | ............... | F01D 11/02 277/412 |
| 2015/0003970 A1 * | 1/2015 | Feldmann | ................. | F01D 9/02 415/173.1 |
| 2015/0086331 A1 * | 3/2015 | Hess | ......................... | F01D 9/04 415/111 |
| 2015/0198056 A1 * | 7/2015 | Amini | ....................... | C08K 3/04 415/173.4 |
| 2015/0267548 A1 * | 9/2015 | Guemmer | ............. | F04D 29/602 415/209.1 |
| 2015/0275687 A1 * | 10/2015 | Bruck | .................. | B23K 25/005 277/345 |
| 2015/0275916 A1 * | 10/2015 | Marshall | ................ | F01D 17/162 415/148 |
| 2016/0097295 A1 * | 4/2016 | Allen | ....................... | F01D 11/122 415/173.4 |
| 2016/0130969 A1 * | 5/2016 | Gold | ....................... | F01D 25/24 415/173.4 |
| 2016/0243620 A1 * | 8/2016 | Butcher | ................. | B23P 15/02 |
| 2016/0319690 A1 * | 11/2016 | Lin | ....................... | F01D 11/122 |

\* cited by examiner

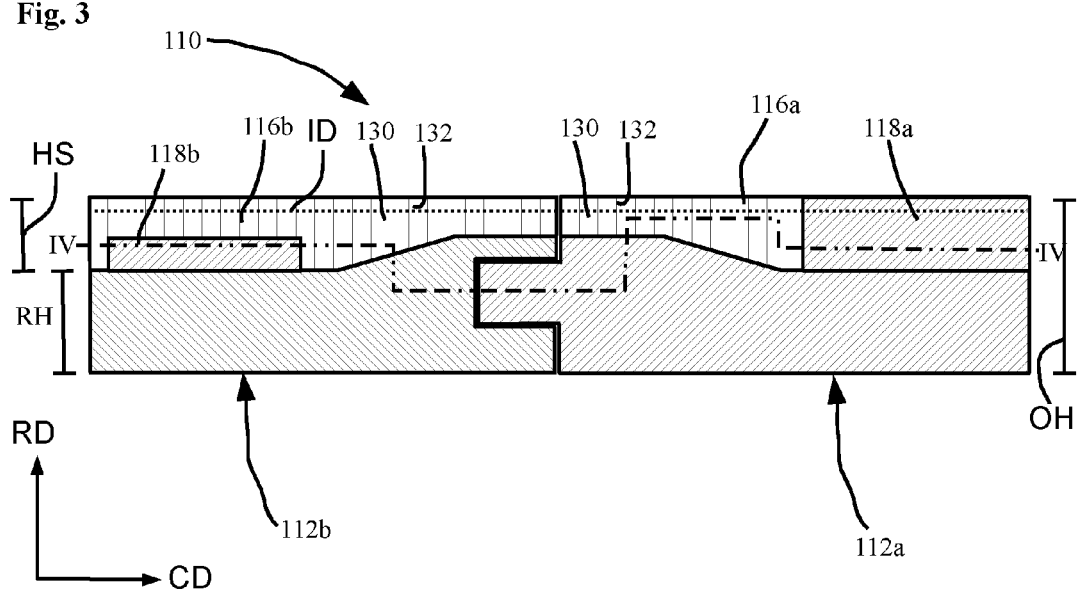
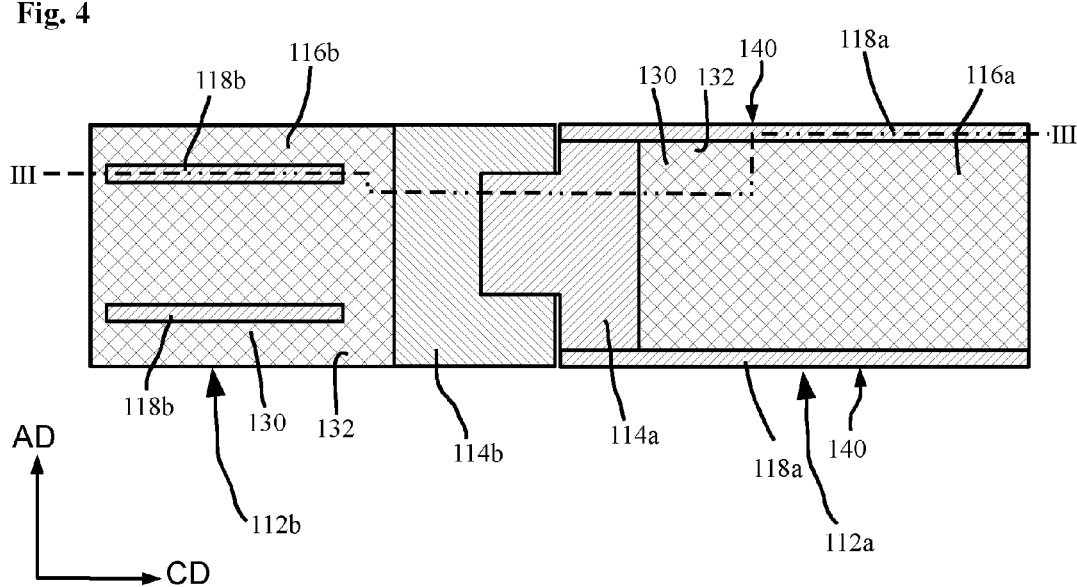

SEAL SEGMENT ASSEMBLY INCLUDING MATING CONNECTION FOR A TURBOMACHINE

This claims the benefit of European Patent Application EP 16163779.8, filed Apr. 5, 2016 and hereby incorporated by reference herein.

The present invention relates to a seal segment assembly for a turbomachine, in particular an industrial gas turbine or an aircraft gas turbine, including a first and second circumferentially adjacently disposed seal carrier, the first seal carrier having a first carrier base and at least one first sealing member that is joined to the first carrier base, and the second seal carrier having a second carrier base and at least one second sealing member that is joined to the second carrier base, the first sealing member and the second sealing member being formed by a plurality of adjacently disposed, in particular circumferentially and axially evenly spaced cavities, the cavities extending radially from the particular carrier base.

Directional indications, such as "axial," "axially," "radial," "radially," and "circumferential" are basically to be understood relative to the machine axis of the turbomachine or gas turbine, unless explicitly or implicitly indicated otherwise from the context.

BACKGROUND

Such seal segment assemblies having honeycomb-structured sealing members are known. The honeycomb-structured sealing members are typically brazed onto the carrier base. The seal carrier is negligibly stiff, in particular circumferentially. This is hardly enhanced by the honeycomb-structured sealing member since the honeycomb cells themselves are not particularly stiff, even circumferentially. Since it is desired that the seal carrier including the sealing member be as flat as possible in the radial direction, the entire component is negligibly stiff.

SUMMARY OF THE INVENTION

It is an object of the present invention to provide a seal carrier that will overcome or even eliminate the above disadvantages.

To achieve this objective, it is provided that the first carrier base and the second carrier base be intercouplable or intercoupled in the circumferential direction by a mating connection assembly.

On the one hand, the mating connection assembly makes possible a simple connection of the first and second seal carrier. On the other hand, the mating connection may create a region of enhanced stiffness for the seal segment assembly.

It is also provided that at least one circumferentially projecting mating element be formed on the first carrier base. It is thereby preferred that at least one mating receptacle be formed on the second carrier base that is adapted for receiving the at least one mating element of the adjacent first carrier base. The embodiment of a mating receptacle and of a mating element is provided, in particular, in a manner that allows a complementary configuration of the mating receptacle and the mating element. A form-fitting, i.e. positive, connection may preferably be produced between the mating element and the mating receptacle.

It is preferred that the height of the first carrier base and of the second carrier base vary circumferentially in the radial direction. In this regard, it is also provided that, at at least one end in the circumferential direction, the first carrier base or/and the second carrier base have a greater radial height than in a middle region, as considered in relation to the circumferential direction. An overall height in the radial direction of the particular carrier base and of the particular sealing member may thereby be essentially constant. The stiffness of the seal carrier may be enhanced by a varying material thickness or height of the carrier base.

It is also provided that a height have a minimum value in the region of the mating connection assembly in the radial direction of the particular sealing member. In other words, the carrier base in question has a maximum height in the region of the mating connection, thus in the region of the mating receptacle or adjacently thereto. This ensures that a sufficient stiffness is attained in the region of the mating connection and that a secure connection is made possible between the first and the second seal carrier.

To further enhance stiffness, at least one stiffening element is provided on the first and second carrier base that is to extend radially from the respective carrier base into the respective sealing member. Such stiffening elements may be provided at different carrier base locations. One option is that stiffening elements extend essentially along the circumferential direction. In addition, the stiffening elements may also extend at an angle relative to the circumferential direction. In particular, it is also conceivable that the stiffening elements mutually intersect. If a stiffening element is exclusively provided in an axially extending region of the turbomachine, where a rotor component's sealing projection is not expected to produce any rubbing contact or abrading action during normal operational use of the turbomachine, then the stiffening element may extend radially to the radially inner free surface of the seal carrier configuration that faces the rotor component, or in special cases, even extend beyond the same. Otherwise, the stiffening element preferably does not extend as far in the radial direction to ensure that it still remains spaced at a distance from the rotor component's sealing projection, even when this sealing projection dips into the seal segment assembly to a maximally provided incursion depth, i.e. run-in or abradable depth.

It is also provided that the cavities of the first and second sealing member be formed by interconnected webs, the webs being configured to form polygonal cavities, in particular honeycomb- or diamond-shaped cavities in a radial plan view.

The first and the second carrier base, the at least one first and second sealing member, and the mating connection assembly are preferably produced by an additive manufacturing process, in particular by selective laser melting. The at least one stiffening element is also produced by the additive manufacturing method, in particular by selective laser melting. Such a method may also be used to manufacture more complex forms of the carrier base and of the sealing member, together with the mating connection assembly. Such a manufacturing method is used to form the seal carrier in one piece, which is likewise advantageous for enhancing stiffness. Moreover, additive manufacturing methods are more cost-effective for more complex forms than are conventional methods where different components are initially manufactured using casting methods and must subsequently be joined in material-to-material bonds (brazing, welding or the like).

It is also provided that the first and the second carrier base, the at least one first and second sealing member, the mating connection assembly and the at least one stiffening element be built up layer by layer, the layers preferably being adjacently disposed in the axial direction (AR).

The present invention also relates to a gas turbine, in particular an aircraft gas turbine having at least one seal segment assembly as described above, the at least one seal segment assembly being associated with a guide vane ring; and, radially inwardly, the first and second sealing member facing a rotating rotor component, in particular a shaft or disk of a rotor blade ring, and sealing projections formed thereon.

By using such a seal segment assembly, an enhanced stiffness is achieved, whereby a tip clearance, i.e. running clearance, formed between the seal member and an opposite sealing projection of the rotor component may also be reduced, for example, because the enhanced stiffness makes it possible to maintain close tolerances. Reducing the tip clearance enhances the sealing action and also, altogether, the overall efficiency of the gas turbine.

Finally, the present invention also relates to an additive method, in particular to a selective laser melting method for manufacturing a seal segment assembly as described above.

The method may be thereby described as follows. Fabricating a first seal carrier, including the steps of building up the first carrier base and the first sealing member layer by layer; for the first sealing member, interconnected, in particular mutually intersecting webs being fabricated to form the sealing member including cavities; building up the mating connection element layer by layer; building up at least one stiffening element layer by layer; building up a second seal carrier, including the steps of: building up the second seal carrier and the second sealing member layer by layer; for the second sealing member, interconnected, in particular mutually intersecting webs being fabricated to form the sealing member including cavities; building up the mating connection receptacle layer by layer; building up at least one stiffening element layer by layer; the first seal carrier and the second seal carrier being built up layer by layer axially or radially relative to a seal carrier used in accordance with the intended purpose thereof. The above described sequence of steps in the layer-by-layer buildup process does not necessarily connote implementing these steps chronologically. Rather, the steps in the layer-by-layer building up of the various components, such as the carrier base, the sealing member, the mating connection element, the mating connection receptacle, the stiffening element may also take place quasi concurrently or essentially at the same time, in particular taking into account which of the components are precisely part of a layer to be created.

In addition, the method may also include a step whereby the webs are built up layer by layer in a way that allows them to form the honeycomb-shaped cavities or mutually intersect at an angle of approximately 90°, respectively form an angle of about 45° with the plane of the layer build-up.

BRIEF DESCRIPTION OF THE DRAWINGS

The present invention will be explained exemplarily in the following with reference to the enclosed figures and without being limited thereto.

In a simplified and schematic, longitudinal cross-sectional view along the circumferential direction.

Simply and schematically.

FIG. 3 shows an illustration of a seal segment assembly similar to that of FIG. 1; the sectional view corresponds approximately to line of intersection of FIG. 4.

FIG. 4 shows an illustration similar to that of FIG. 2, other embodiments of a sealing member and of stiffening elements being shown; the sectional view corresponds approximately to line of intersection IV-IV of FIG. 3.

DETAILED DESCRIPTION

Figure 1:
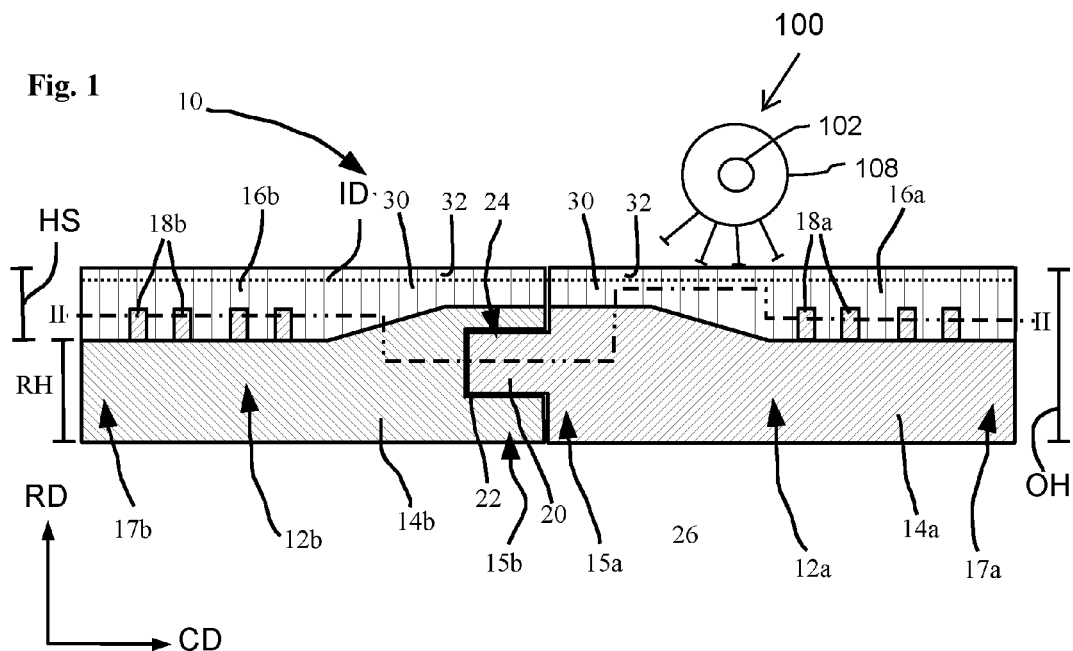
FIG. 1 shows a specific embodiment of a seal segment assembly, approximately in correspondence with a line of intersection I-I of FIG. 2.

FIG. 1 shows a simplified and schematic sectional view of a seal segment assembly 10. The cross-sectional plane is defined by radial direction RD and circumferential direction CD. Seal segment assembly 10 has a first seal carrier 12a and a second seal carrier 12b that are adjacently disposed in circumferential direction CD. First seal carrier 12a includes a first carrier base 14a and a first sealing member 16a secured thereto. Analogously, second seal carrier 12b features a carrier base 14b and a sealing member 16b. Also provided on both seal carriers 12a, 12b are stiffening elements 18a, 18b that extend in radial direction RD into respective sealing member 16a, 16b and are joined to particular carrier base 14a, 14b. The first and the second sealing members 16a and 16b radially inwardly may face a rotating rotor component 100 (shown schematically), the rotating rotor component for example can be a rotor blade ring including a plurality of rotor blades mounted to a disk 108, wherein the disk 108 extends around a shaft 102, also all shown schematically. The blades may have an outer platform or a shroud with sealing projections formed thereon. The sealing projections extend radially from the shroud. The seal segment assembly thus, while shown straight solely for illustrative purposes, is part of an annular ring around the shaft 102. While in FIG. 1 the seal segment assembly is depicted to be radially outside of the rotor blades, it may also be part of an annular ring extending radially inside of the rotor blades around the shaft 102, wherein in this case the sealing projections are likewise arranged radially inside of the rotor blades and are formed on a different position of the rotor component. In both cases the radial distance of the sealing projections from the shaft 102 can be smaller than the radial distance of the sealing members 16a, 16b from the shaft 102, such that the sealing members 16a, 16b can radially inwardly face a rotating rotor component on which the sealing projections are formed.

At the end thereof facing second seal carrier 12b in the circumferential direction, first seal carrier 14a has a projecting mating element 20. Mating element 20 is preferably formed in one piece with carrier base 14a. At the end thereof facing second seal carrier 12b in the circumferential direction, first seal carrier 12a has a mating receptacle 22 in which mating element 20 of first seal carrier 12a may be or is received. Together, mating element 20 and mating receptacle 22 form a mating configuration 24 of seal segment assembly 10.

The mating configuration is shown here purely schematically and in a simplified form, mating element 20 having a rectangular shape. However, this embodiment is purely exemplary. Other shapes of the mating element are also conceivable, for instance including curved portions, other polygonal shapes, or also combinations of angular and curved shapes. Mating receptacle 22 is preferably configured to be complementary to mating element 20, making possible a form-fitting connection between mating element 20 and mating receptacle 22.

Relative to a reference side 26 that is disposed radially outwardly in FIG. 1, respective carrier base 14a, 14b features a radial height RH that varies along circumferential direction CD. The radial height may also be referred to as the thickness of carrier base 14a, 14b, As is readily apparent from FIG. 1, a radial overall height OH of a seal carrier 12a, 12b, respectively of seal segment assembly 10 may also be essentially the same over the entire extent in circumferential direction CD. An increasing height HC of carrier base 14a, 14b is compensated by a reduction in height HS of sealing member 18a, 18b in question. It should be thereby noted that sealing member 16a, 16b may not be arbitrarily narrow in radial direction RD. Height HS of sealing member 16a, 16b must be greater than a possible maximum incursion depth ID. Incursion depth ID thereby refers to the region of sealing member 16a, 16b that may be removed during operation by a sealing projection of a gas turbine's rotor component. As is readily apparent from FIG. 1, at least one end 15a, 15b in the circumferential direction, carrier bases 14a, 14b have a greater radial height RH than in a middle region 17, as considered in relation to circumferential direction (CD). In particular, in the region of mating connection assembly 24, carrier bases 14a, 14b are at the greatest height thereof. This makes it possible to provide mating receptacle 22 and enhances stiffness in the region of the mating connection. It is clear that radial height RH that is greater in circumferential direction CD may also be provided at a respective other end in circumferential direction CD of respective carrier base 14a, 14b, even when the other ends are not shown in the figures.

Figure 2:
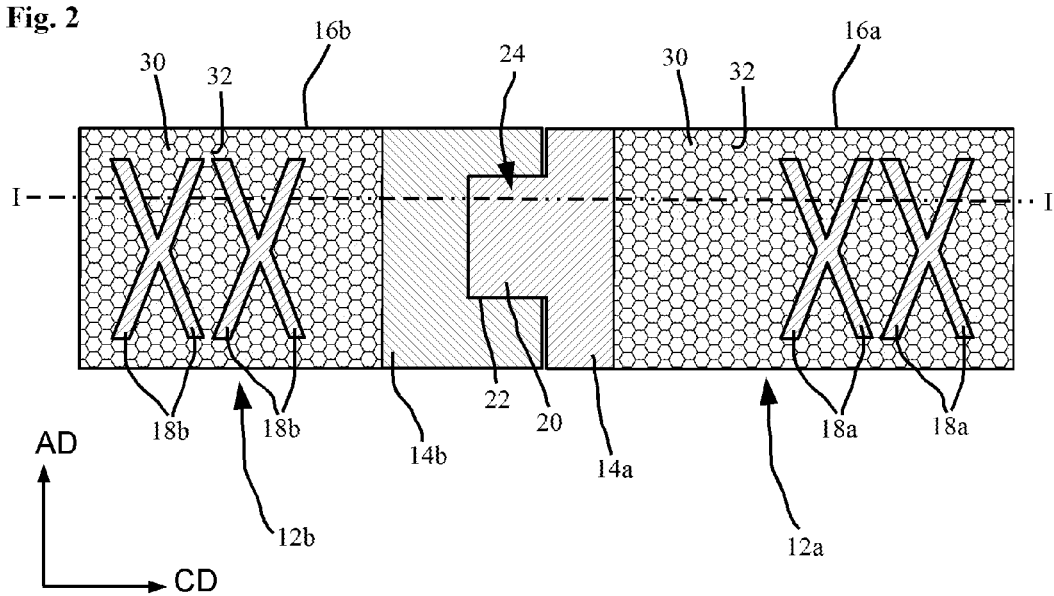
FIG. 2 shows a sectional plan view from the radial direction, the section being selected approximately in correspondence with line of intersection II-II of FIG. 1.

As is also apparent from the sectional view in accordance with FIG. 2, sealing member 16a, 16b includes a plurality of cavities 30 that are circumferentially and axially adjacently disposed and are bounded by webs 32. Cavities 30 essentially extend in radial direction RD. In the example of FIG. 2, cavities 30 are honeycomb-shaped. Also apparent from FIG. 2 is that two stiffening elements 18a, 18b have an intersecting configuration, so that, together, they form an X-shaped stiffening member. Two intersecting, respectively X-shaped stiffening members are provided in each seal carrier 12a, 12b.

Thus, stiffening elements 18a, 18b are ribs that project in radial direction RD and make it possible to enhance the stiffness of carrier base 14a, 14b, respectively of particular seal carrier 12a, 12b, in particular, the stiffness being enhanced in circumferential direction CD.

Carrier bases 12a, 12b of sealing members 16a, 16b and stiffening elements 18a, 18b are preferably formed in one piece, respectively integrally with one another. It is especially preferred that they be produced using an additive manufacturing process, such as selective laser melting. In the case of first seal carrier 12a, mating element 20 is also joined in one piece with the remainder of seal carrier 12a. In the case of second seal carrier 12b, the mating receptacle is recessed in carrier base 14b that is formed in one piece. More complex forms of carrier bases 14a, 14b, of stiffening elements 18a, 18b, and of sealing members 16a, 16b may be produced by using additive manufacturing methods, such as selective laser melting, in particular, to form seal carriers 12a, 12b in one piece, respectively integrally. It is hereby also possible to provide stiffening elements 18a, 18b in the region of sealing member 16a, 16b, which had not been possible using known methods heretofore (brazing the sealing member to the carrier base).

In illustrations analogous to those of FIGS. 1 and 2, FIGS. 3 and 4 show a specific embodiment of a seal carrier 110 where hollow cells 130 of sealing members 116a, 116b are diamond-shaped. The provision of intersecting webs 132 likewise enhances the stiffness of sealing members 116a, 116b in circumferential direction CD.

In addition, in the case of first seal carrier 112a in FIG. 3, two first stiffening elements 118a are provided that extend along the circumferential direction and are provided at axial end regions 140 of first seal carrier 112a. First sealing member 116a is thereby accommodated in axial direction AD between the two first stiffening elements 118a. Height HS of first stiffening elements 118a is preferably essentially the same as that of first sealing member 116a, allowing them to cover sealing member 116a, as is readily apparent to the right in FIG. 3, in particular. Configuring first sealing member 116a in the axial direction between stiffening elements 118a ensures that the sealing projection of the turbomachine's or gas turbine's rotor component could only come in contact with first sealing member 116a and not with stiffening elements 118a in the case of a rubbing contact or abrading action.

In the case of second seal carrier 112b (left side of FIGS. 3 and 4), two second stiffening elements 118b are provided that extend in circumferential direction CD. These two second stiffening elements 118b are again formed exemplarily to be lower in height than second sealing member 116b. Accordingly, second stiffening elements 118b are not visible from the outside, but are integrally accommodated or formed in second sealing member 116b.

Stiffening elements 118a, 118b presented with reference to FIGS. 3 and 4 are exemplary embodiments. It is self-evident that stiffening elements 118a, 118b may also have other forms or extend in other main directions. It is also self-evident that stiffening elements 118a, 118b may be combined with a honeycomb-structured sealing member 16a, 16b (FIG. 1). Stiffening elements 18a, 18 (FIG. 1) may also be combined with sealing member 116a, 116b having diamond-shaped cavities 130. Other parts or features of seal carrier 110 not described for FIGS. 3 and 4 are analogous to the first specific embodiment of FIGS. 1 and 2 and, in this regard, reference is made to the description therefor. Seal carrier 110 is also preferably produced by an additive manufacturing method, such as selective laser melting, for example. It is also noted that, in the case of a seal segment assembly 110, a type of stiffening element 118a, 118b is also typically used for first seal carrier 114a and second seal carrier 114b. The different stiffening elements 118a and 118b shown in FIGS. 3 and 4 are shown purely exemplarily in same seal segment assembly 110.

LIST OF REFERENCE NUMERALS

| | |
|---|---|
| 10, 110 | seal segment assembly |
| 12a, 12b, 112a, 112b | first/second seal carrier |
| 14a, 14b, 114a, 114b | first/second carrier base |
| 15a, 15b | end in the circumferential direction |
| 16a, 16b, 116a, 116b | first/second seal carrier |
| 17a, 17b | middle region in the circumferential direction |
| 18a, 18b, 118a, 118b | stiffening elements |
| 20 | mating element |
| 22 | mating receptacle |
| 24 | mating configuration |
| 26 | reference side |
| 30, 130 | cavity |
| 32, 132 | web |
| 100 | rotor component |
| 102 | rotor shaft |
| 108 | rotor ring |
| 140 | end region |
| AD | axial direction |
| ID | incursion depth |
| OH | overall height of seal carrier |

-continued

LIST OF REFERENCE NUMERALS

| HS | height of sealing member |
|---|---|
| HC | height of carrier base |
| RD | radial direction |
| CD | circumferential direction |

What is claimed is:

1. A seal segment assembly for a turbomachine, the seal segment comprising:
a first seal carrier and a second seal carrier adjacently disposed in a circumferential direction, the first seal carrier having a first carrier base and at least one first sealing member joined to the first carrier base, and the second seal carrier having a second carrier base and at least one second sealing member joined to the second carrier base, the first sealing member and the second sealing member being formed by a plurality of cavities adjacently disposed in the circumferential direction and in an axial direction, the cavities extending in a radial direction from the particular first or second carrier base, wherein the first carrier base and the second carrier base are intercouplable or are intercoupled in the circumferential direction by a mating connection assembly; wherein at least one mating element projects in the circumferential direction and is formed on the first carrier base, wherein at least one mating receptacle is formed on the second carrier base adapted for receiving the at least one mating element of the adjacent first carrier base, wherein the first and the second carrier base, the at least one first and second sealing member, and the mating connection assembly are additively manufactured, the first seal carrier including the first carrier base, the first sealing member and the at least one mating element being made as one piece and the second seal carrier including the second carrier base, the second sealing member and the at least one mating receptacle being made as one piece.

2. The seal segment assembly as recited in claim 1 wherein the plurality of cavities are adjacently evenly spaced.

3. The seal segment assembly as recited in claim 1 wherein, in the radial direction, a height of the first carrier base and of the second carrier base varies along the circumferential direction.

4. The seal segment assembly as recited in claim 3 wherein at at least one end in the circumferential direction, the first carrier base or the second carrier base has a greater radial height than in a middle region, as considered in relation to the circumferential direction.

5. The seal segment assembly as recited in claim 3 wherein an overall height in the radial direction of the particular first or second carrier base and of the particular first or second sealing member is essentially constant.

6. The seal segment assembly as recited in claim 1 wherein, in the radial direction of the first or second sealing member, a height of the first or second sealing member has a minimum value in a region of the mating connection assembly.

7. The seal segment assembly as recited in claim 1 wherein, on the first carrier base and on the second carrier base, at least one stiffening element is provided to extend from the respective first or second carrier base in the radial direction into the respective sealing member.

8. The seal segment assembly as recited in claim 1 wherein the cavities of the first and second sealing member are formed by interconnected webs, the webs being configured to form polygonal cavities in a plan view in the radial direction.

9. The seal segment assembly as recited in claim 1 wherein the first and the second carrier base, the at least one first and second sealing member, and the mating connection assembly are selectively laser melted.

10. The seal segment assembly as recited in claim 7 wherein the at least one stiffening element is produced by the additive manufacturing method.

11. The seal segment assembly as recited in claim 10 wherein the at least one stiffening element is produced by selective laser melting.

12. The seal segment assembly as recited in claim 10 wherein the first and the second carrier base, the at least one first and second sealing member, the mating connection assembly, and the at least one stiffening element are made of layers built up layer by layer.

13. The seal segment assembly as recited in claim 12 wherein the layers are adjacently disposed in the axial direction.

14. A gas turbine comprising:
at least one seal segment assembly as recited in claim 1 wherein the at least one seal segment assembly is associated with a stator vane ring, and the first and the second sealing members radially inwardly face a rotating rotor component.

15. The gas turbine as recited in claim 14 wherein the rotating rotor component is a shaft or a disk of a rotor blade ring, with sealing projections formed thereon.

16. An aircraft gas turbine comprising the gas turbine as recited in claim 14.

17. An additive method for manufacturing the seal segment as recited in claim 1.

18. The additive method as recited in claim 17 wherein the additive method includes selective laser melting.

19. The seal segment assembly as recited in claim 1 wherein the cavities are honeycomb- or diamond-shaped cavities.

20. The seal segment assembly as recited in claim 1 wherein the mating element has a rectangular shape.

21. The seal segment assembly as recited in claim 7 wherein the stiffening member is X-shaped.

* * * * *